June 13, 1967      K. E. DILLENDER      3,325,212
LOAD BEARING RETRACTOR FOR SAFETY BELTS
Filed Jan. 7, 1966      2 Sheets-Sheet 1
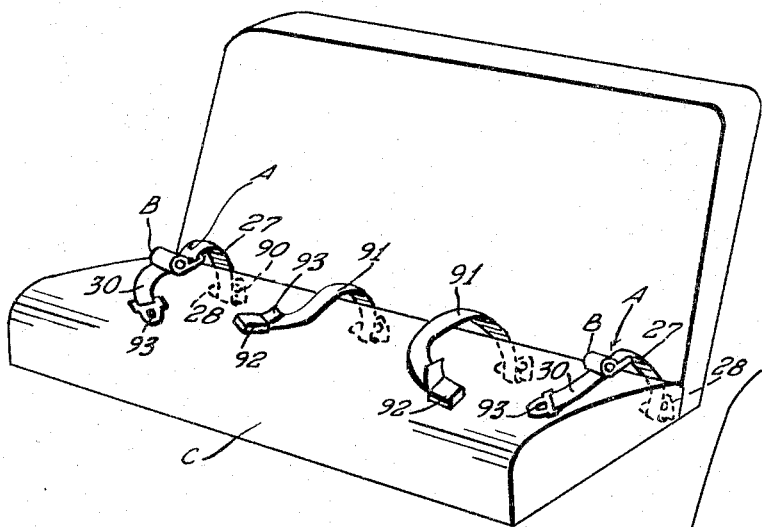
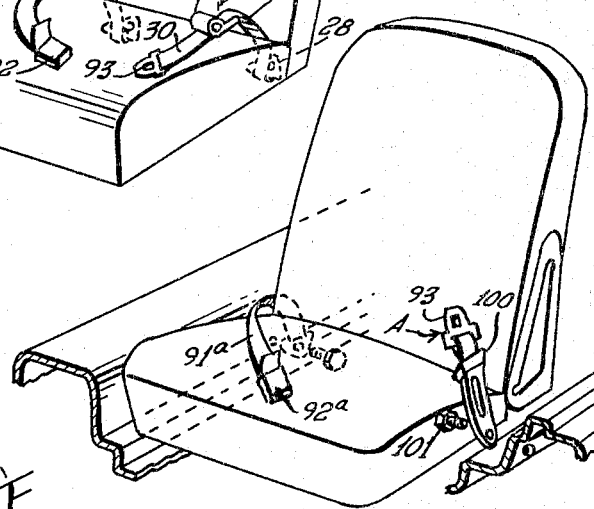
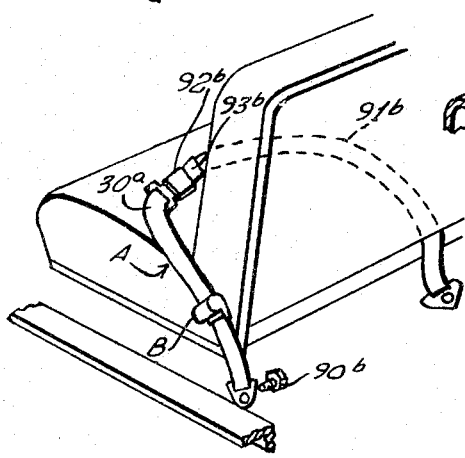
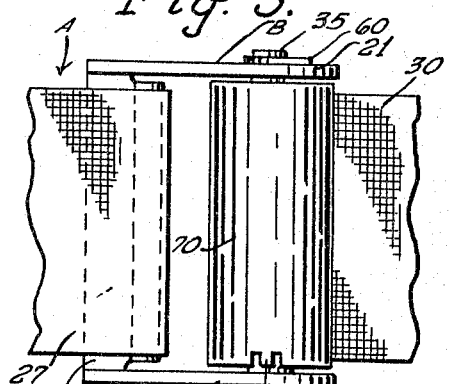
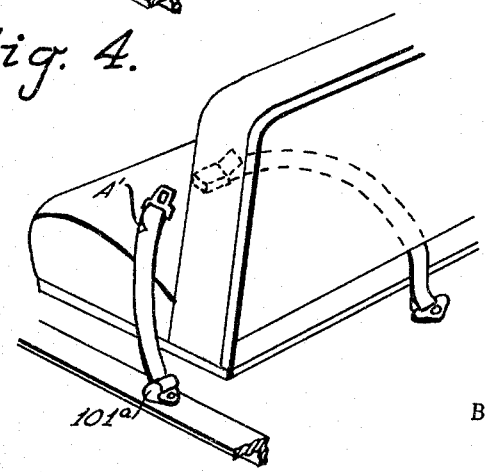
INVENTOR
Karl E. Dillender.
BY *Rommel, Allwine and Rommel*
ATTORNEYS

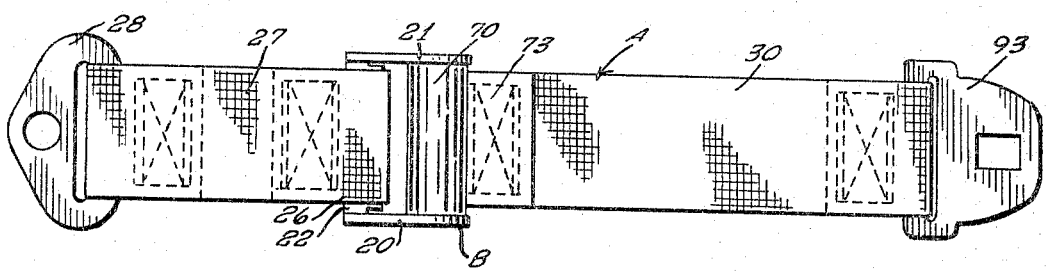
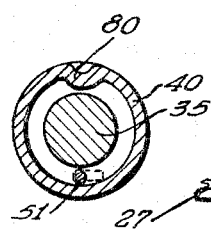
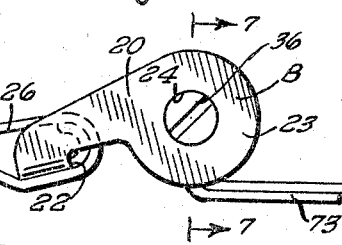
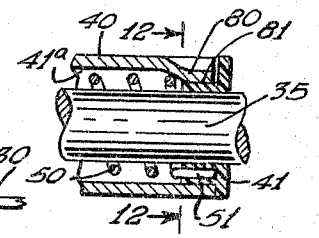
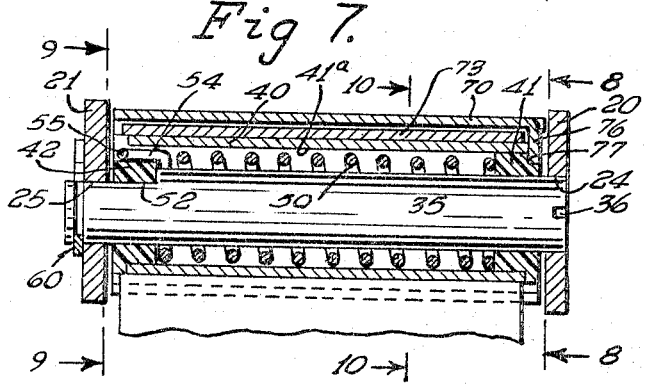
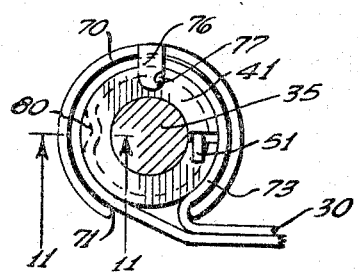
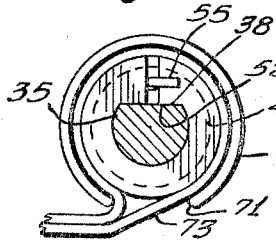
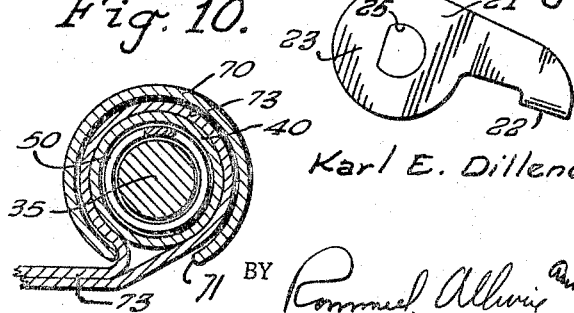
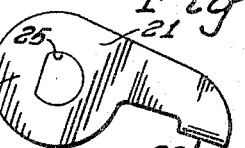

United States Patent Office 3,325,212
Patented June 13, 1967

3,325,212
LOAD BEARING RETRACTOR FOR SAFETY BELTS
Karl E. Dillender, Lexington, Ky., assignor to Irving Air Chute Company, Inc., Lexington, Ky., a corporation of New York
Filed Jan. 7, 1966, Ser. No. 519,208
5 Claims. (Cl. 297—388)

This invention relates to a safety belt construction, comprising a compact, low cost load bearing retractor which may have varied application in connection with safety belts, for use upon, under, at the sides of or behind seats, on floors, door posts, etc.

A further object of this invention is the provision of a small, convenient and safe load bearing retractor for safety belts of the non-locking type, including means for automatic take-up of a safety belt section after the belt buckle has been opened and released, for the purpose of removing the belt section to an out-of-the-way position.

Other objects and advantages of this invention will be apparent during the course of the following detailed description.

In the accompanying drawings, forming a part of this specification, and wherein similar reference characters designate corresponding parts throughout the several views:

FIG. 1 is a perspective view of a rear seat construction of an automobile having the safety belt portions attached thereto or to the frame of the car, but with the improved load bearing retractor belt webbing extended.

FIG. 2 is a perspective view showing the application of a seat belt to a front seat and car frame, including one of the improved load bearing retractors and a boot therefor.

FIG. 3 is a fragmentary perspective view of the installation of the improved load bearing retractor for a front seat, without boots.

FIG. 4 is a fragmentary perspective view of a front seat of a vehicle showing the safety belt means including a load bearing retractor.

FIG. 5 is a fragmentary plan view of a portion of a seat belt showing its improved load bearing retractor frame.

FIG. 6 is a fragmentary side elevation of the retractor shown in FIG. 5.

FIG. 7 is an enlarged cross sectional view taken substantially on the line 7—7 of FIG. 6, showing internal details of the improved retractor.

FIGS. 8, 9 and 10 are cross sectional views through the retractor taken substantially on the line 8—8, 9—9 and 10—10 respectively of FIG. 7.

FIG. 11 is a cross sectional view taken substantially on the line 11—11 of FIG. 8.

FIG. 12 is a cross sectional view taken substantially on the line 12—12 of FIG. 11.

FIG. 13 is a plan view of one of the improved retractor structures including belt ends extended.

FIG. 14 is a side elevation of the retractor frame, opposite side from than shown in FIG. 6.

In the drawings wherein for the purpose of illustration is shown a preferred embodiment of the invention, the load bearing non-locking retractor belt structure is shown at A in FIG. 13 and throughout the other views. It comprises a frame piece B, generally of U-shaped construction including side or leg portions 20 and 21 and a spaced offset cross bar 22. This frame member is of rigid material such as metal or hard plastic. The leg portions 20 and 21 at their ends are enlarged at 23, one of them being provided with a circular opening 24 therethrough and the other being provided with a segmental opening 25 (see FIG. 14).

The cross bar 22 of frame B is adapted to receive thereon a permanent loop 26 of a seat belt length 27. The latter at the outer end is provided with an apertured plate 28 adapted for attachment to the seat or vehicle frame. This length 27 is shorter than the belt length 30 adapted to be wound upon the retractor A. The latter consists of a rigid axle 35, one end of which is socketed in the opening 24 of the frame leg 20. It may be provided with kerf 36. The other end of the axle 35 is of segmental cross section and flattened at 38 adapted to fit into the opening 25 so the axle 35 is non-rotatable upon the frame B and extends the distance between the legs 20 and 21, as can be seen in FIG. 7.

The axle 35 forms means for rotatably supporting an end of the belt section 30. The means by which this belt section is mounted upon the axle 35 comprises a cylindrical shaped spool or roller 40 having a passageway 41a therethrough and the ends of which receive "Teflon" bearing caps 41 and 42. The caps are externally flanged and their reduced ends are inserted into the passageway 41a as shown in FIGS. 7 and 11 of the drawings.

A spiral spring 50 is mounted in the passageway 41a of the spool 40 having one end thereof anchored as at 51 upon the rotatable cap 41, which is mounted for rotation on the axle 35. The other cap 42 is formed as shown at FIG. 9 with a segmental opening 52 to receive the segmental end of the axle 35 whereby the cap 42 is anchored on the axle 35 against rotation. The spring 50 has an end 54 which extends through a slot in the rotatable cap 42 and is anchored thereon at 55 (FIG. 9). It is obvious that if the spool 40 is rotated on the axle 35 the spring will be biased to store up energy for rotating the spool to a return position.

The axle 35 is anchored by clip 60 upon the frame arm 21 against endwise movement.

A belt web retainer 70 is provided. It is split or slotted longitudinally at 71. The spool 40 is adapted to receive the permanently looped end 73 of the belt section 30. The retainer 70 is adapted to receive the wound belt portion 30 thereon. It rotates with the cap 41 and the spool 40 and to that end it is provided with a projection 76 (FIG. 8) which engages in a recess 77 (FIG. 7) in the cap 41.

For the purpose of securing the spool 40 to the bearing 41 for rotation therewith, a key 80 (FIG. 11) is provided in the spool 40. It engages in a recess 81 (FIG. 12) provided in the bearing 41.

The belt end portions 27 and 30 form a single belt section; the retractor lying intermediate the ends thereof. The spring 50 can be biased to any degree by inserting a screwdriver in the kerf 36 for automatically rolling the belt section 30 thereon to the required extent. The belt 30 can be substantially completely collapsed on the retainer 70. In FIG. 13 the belt is shown fully extended but the portion 30, if released, will be wound by the biasing spring 50 upon the belt retainer 70 to almost completely collapse the belt section in an out-of-the-way compact position.

In FIG. 1 the belt portion A is provided for each occupant of the seat C. In this form of installation the load bearing retractor portion 27 is located between the two cushions and anchored at 90 upon the frame to the rear of the seat, extending upwardly between the seat back and cushion. While the sections A are shown extended they are normally collapsed. Each section A furthermore includes a complementary belt section 91 having a buckle 92 thereon adapted to receive the locking tongue 93 attached to the free end of the portion 30 of the belt B. It should be noted, in this connection, that the retractor belt section B will automaticaly collapse upon release of the buckle 92. The buckle 92 may be adjusted as to length along the belt section 91 by means of a strap end 93, the operation of which is of common knowledge.

In the form shown in FIG. 2 the load bearing retractor A may be housed within a boot 100 attached at 101 in any approved manner to the vehicle seat or a vehicle frame and the other belt portion 91ª is provided with a buckle 92ª which can be adjusted along the length of the belt 91ª.

As shown in FIG. 3 the extended load bearing retractor A may be secured at 90ᵇ to a portion of the vehicle or seat thereof and it includes a retractor A of the type above described; the belt section 30ª thereof being provided with a locking tongue 93ᵇ which may releasably engage with a buckle 92ᵇ mounted on a belt 91ᵇ which may be attached at its opposite end to the frame or seat of a car.

As shown in FIG. 4 the modified retractor A' is provided with a boot or member 101ª and may be collapsed therein by the mechanism above described; the other details being substantially identical with those shown in FIG. 3.

It should be noted that the load bearing retractor A is non-locking. That is, it is not provided with an inertia lock, since it is intended to be used with a seat belt having means for adjusting the size thereof so that the retractor belt will be fully extended when the belt is wholly applied to the occupant.

Various changes in the size, shape and arrangement of parts may be made to the form invention shown herein without departing from the spirit of the invention or scope of the following claims.

I claim:

1. In a self-retractable seat belt construction adapted for attachment to a vehicle, a belt supporting frame, means for attaching the belt supporting frame member to a vehicle, a rotatable spool mounted on the frame, a belt section attached to the spool for winding thereon, spring means biasing the spool on the frame for the winding of the belt section thereon, a second belt section attached to the vehicle in complementary relation to the first mentioned belt section, and connectable buckle parts attached to each of the proximate ends of the belt sections for coupling said belt sections together, said second belt section having means thereon for manually adjusting the effective length thereof from its buckle part to its point of attachment with the vehicle, the self-retractable seat belt construction including a seat belt portion fixedly connected to the frame member and adapted for attachment to the vehicle, and a second separate flexible belt portion connected upon the spool for winding thereon.

2. In a self-retractable seat belt construction the combination of a frame member having a pair of mounting sides, an axle having an end keyed to one of said mounting sides against rotation, a spool rotatable on said axle having a bearing at one end keyed against rotation to said axle at the same end thereof as the axle is keyed to said frame member, the opposite end of the spool having a rotatable bearing keyed thereto mounted for rotation upon said axle, a spiral spring surrounding the axle and located within the spool having one end secured to the non-rotatable bearing and its opposite end to the rotatable bearing, a belt section attached to the spool having means securing it to the rotatable bearing portion of the spool for winding and unwinding the same with respect to the spool, and a web retainer keyed upon the rotatable bearing comprising a split cylinder portion through the split of which the belt extends and is looped upon said spool whereby when the retainer and spool are rotated the belt section will be wound upon said split cylinder portion.

3. A self-retractable seat belt construction as defined in claim 2 in which the frame is of U-shaped construction, including side portions and a cross bar to which a second web portion is fixedly connected.

4. In a self-retractable seat belt construction the combination of a frame portion having means for attachment thereof to a vehicle, said frame portion including side bars, a split cylinder rotatably mounted upon said frame portion and disposed around said spool for rotation therewith for the winding and unwinding of the belt section thereon, an axle extending between and mounted upon side bars and non-rotatable with respect thereto, a spool having a bearing at one end rotatably mounted upon said axle, a second bearing mounted at the opposite end of the axle in non-rotatable relation thereon having said spool rotatably mounted thereon, a biasing spring having connections at its opposite ends with said rotatable and non-rotatable bearings, a flexible belt section looped around said spool, and a slotted cylinder mounted around said spool upon the bearings for guiding and winding and unwinding the flexible belt with respect to said spool.

5. The construction defined in claim 4 in which the cylinder comprises a split retainer sleeve keyed to the non-rotatable bearing having a split opening therein through which a flexible belt section is adapted to extend for the winding and unwinding of said section upon the exterior of said split retainer sleeve.

References Cited

UNITED STATES PATENTS

| | | | |
|---|---|---|---|
| 379,887 | 3/1888 | Crannell | 242—74.1 X |
| 1,183,819 | 5/1916 | Keiser | 242—74.1 |
| 2,846,745 | 8/1958 | Lathrop | 24—179 |
| 2,861,627 | 11/1958 | Smith | 297—388 |
| 2,964,815 | 12/1960 | Sereno | 24—75 |
| 3,171,688 | 3/1965 | Nicholas | 297—388 |
| 3,223,236 | 12/1965 | Troendly | 297—388 X |
| 3,246,929 | 4/1966 | Taggart | 297—388 |
| 3,248,069 | 4/1966 | Nichols | 242—107.4 |
| 3,249,386 | 5/1966 | Board et al. | 297—388 |
| 3,257,147 | 6/1966 | Carter | 297—388 |

CASMIR A. NUNBERG, *Primary Examiner.*

UNITED STATES PATENT OFFICE
CERTIFICATE OF CORRECTION

Patent No. 3,325,212  June 13, 1967

Karl E. Dillender

It is hereby certified that error appears in the above numbered patent requiring correction and that the said Letters Patent should read as corrected below.

Column 4, lines 19 to 21, strike out "a split cylinder rotatably mounted upon said frame portion and disposed around said spool for rotation therewith for the winding and unwinding of the belt section thereon,"; same column 4, line 22, after "upon" insert -- the --.

Signed and sealed this 6th day of August 1968.

(SEAL)
Attest:

Edward M. Fletcher, Jr.
Attesting Officer

EDWARD J. BRENNER
Commissioner of Patents

UNITED STATES PATENT OFFICE
CERTIFICATE OF CORRECTION

Patent No. 3,325,212                      June 13, 1967

Karl E. Dillender

It is hereby certified that error appears in the above numbered patent requiring correction and that the said Letters Patent should read as corrected below.

Column 4, line 35, for "non-rotatable" read -- rotatable --.

Signed and sealed this 10th day of December 1968.

(SEAL)
Attest:

Edward M. Fletcher, Jr.             EDWARD J. BRENNER
Attesting Officer                 Commissioner of Patents